United States Patent
Sim et al.

(10) Patent No.: US 9,313,622 B2
(45) Date of Patent: Apr. 12, 2016

(54) RADIO COMMUNICATION SYSTEM ENABLING MULTIPLEX COMMUNICATION

(71) Applicant: YEONHAB PRECISION CO., LTD., Chungcheongnam-do (KR)

(72) Inventors: Soung Bo Sim, Chungcheongnam-do (KR); Bong Goo Kim, Chungcheongnam-do (KR); Seok Nam Kim, Gyeonggi-do (KR)

(73) Assignee: YEONHAB PRECISION CO., LTD., Chungcheongnam-Do (KR)

( * ) Notice: Subject to any disclaimer, the term of this patent is extended or adjusted under 35 U.S.C. 154(b) by 72 days.

(21) Appl. No.: 14/374,078

(22) PCT Filed: Jan. 22, 2013

(86) PCT No.: PCT/KR2013/000505
§ 371 (c)(1),
(2) Date: Jul. 23, 2014

(87) PCT Pub. No.: WO2013/111961
PCT Pub. Date: Aug. 1, 2013

(65) Prior Publication Data
US 2015/0119095 A1    Apr. 30, 2015

(30) Foreign Application Priority Data
Jan. 26, 2012 (KR) .................. 10-2012-0007975

(51) Int. Cl.
*H04B 7/00* (2006.01)
*H04W 4/10* (2009.01)
*H04W 76/00* (2009.01)

(52) U.S. Cl.
CPC .............. *H04W 4/10* (2013.01); *H04W 76/005* (2013.01)

(58) Field of Classification Search
CPC ....... H04W 4/10; H04W 76/005; H04W 4/22; H04W 76/007; H04W 84/20; H04W 92/18; H04W 88/04
USPC .............. 455/518, 519, 445, 423, 422.1, 403, 455/426.1, 426.2, 426, 500, 517, 507, 508, 455/515, 521, 404.1; 370/259, 261, 262, 370/328, 329, 343, 310, 406, 408
See application file for complete search history.

(56) References Cited

U.S. PATENT DOCUMENTS

2010/0178911 A1* 7/2010 Dailey .................. H04W 84/20
455/422.1

FOREIGN PATENT DOCUMENTS

| KR | 1020020009283 | 2/2002 |
| KR | 1020050025685 | 3/2005 |
| KR | 1020050063750 | 6/2005 |

* cited by examiner

*Primary Examiner* — Keith Ferguson
(74) *Attorney, Agent, or Firm* — IPLA P.A.; James E. Bame

(57) ABSTRACT

A radio system capable of multiplexing communication includes a main radio, a master radio, a sub-radio, and a connecting unit having a PTT switch built therein. The enforcement of tactical operations and maintaining a dominant position in terms of combat effectiveness can be achieved by performing swift and smooth communication using master and sub-radios.

6 Claims, 7 Drawing Sheets

FIG. 8
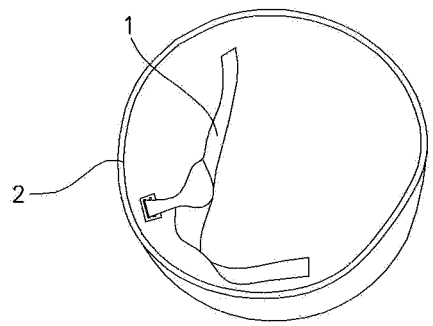
FIG. 9
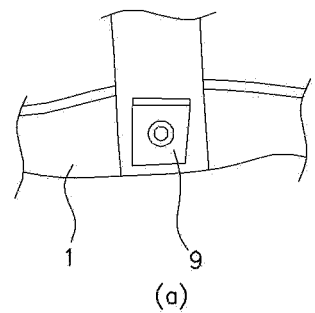
(a)
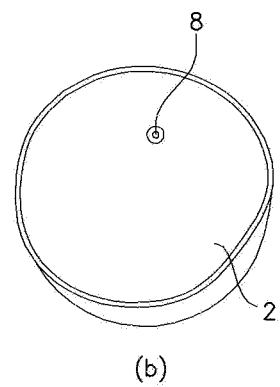
(b)

000# RADIO COMMUNICATION SYSTEM ENABLING MULTIPLEX COMMUNICATION

BACKGROUND

The present invention relates generally to a radio communication system enabling multiplex communication and, more particularly, to a radio communication system enabling multiplex communication for allowing multiple members who are located within a certain distance to freely engage in bidirectional voice radio communication.

In a military or police operation, which is generally carried out by a small team comprised of five to seven persons, each member has a small radio set for short range communication between individual members, which is operated as follows:

A radio set for short range communication is mainly classified into a main radio set serving as a master and a subsidiary radio set serving as a slave.

However, in the conventional art, commands have been transferred in a way that the main radio set is held only by those who are squad leader level or higher and these persons forward the commands to other team members who do not possess the main radio.

Accordingly, the commands are not smoothly transferred to the team members due to a restriction on voice command transfer, and thus a problem of weakened tactical operations is expected.

SUMMARY OF THE INVENTION

Accordingly, the present invention has been made keeping in mind the above problems occurring in the conventional art, and an object of the present invention is to provide a radio communication system enabling multiplex communication in order to strengthen tactical operations and ensure superior combat effectiveness by making fast and streamlined communication possible, by allowing individual members to possess either: a main radio set performing long range radio communication; a master radio set connected to the main radio set; or a subsidiary radio set performing short range radio communication with the master radio set, with the master radio set functioning so as to output every voice input by the subsidiary radio sets and all of the other subsidiary radio sets, as well as the master radio set functioning so as to output commands forwarded from any higher level radio set than the master radio set.

Another object of the present invention is to provide a radio communication system enabling multiplex communication for the purpose of allowing an establishment of another communication network by which, when any subsidiary radio goes beyond a coverage area available for communication with a master radio set and loses radio communication, one of the subsidiary radio sets can be changed to function as a master; that is a "slave master radio set" and the remaining slave radio sets can engage in radio communication with the slave master radio set.

A further object of the present invention is to provide a radio communication system enabling multiplex communication for allowing notification of members that a master radio set and subsidiary radio sets have gone beyond or come into a radio communication coverage area by controlling a notification unit and displaying that a slave master radio set has been established, via a display unit.

In order to accomplish the above objects, an aspect of the present invention provides A radio communication system enabling multiplex communication, comprising: a master radio set including: a main radio set carrying out long-range radio communication, a master communication unit carrying out wired communication for allowing voice signals to be transmitted/received to/from the main radio set, a master transmitter to which voice signals are input, a master receiver outputting voice signals, and a master controller for controlling the master communication according to an on or off state of a PTT switch; a plurality of subsidiary radio sets, each including: a subsidiary communication unit carrying out short-range radio communication for allowing voice signals to be transmitted/received to/from the master communication unit, a subsidiary transmitter to which voice signals are input, a subsidiary receiver outputting voice signals, and a subsidiary controller carrying out a control function in such a way that, when the subsidiary radio sets go outside a coverage area available for communication with the master radio set and lose radio communication, any one of the subsidiary radio sets having radio communication disconnected can be changed to a slave master radio set; and a connection unit connecting the main radio set and the master radio set to each other to transmit and receive voice signals, and provided with a PTT switch to carry out a control function so as to transmit and receive voice signals in a PTT method.

Each of the master radio set and subsidiary radio sets further include a volume-up switch and a volume-down switch to adjust volume of the master receiver and the subsidiary receivers, and a mode switch for changing predetermined communication modes, the subsidiary controller carrying out the control function in such a way that, when the subsidiary radio sets go beyond the coverage area available for communication with the master radio set and lose radio communication, and input signals of the mode switch and the volume-up switch are applied from any one of the subsidiary radio sets with radio communication disconnected, the subsidiary radio set is changed to the slave master radio set, when input signals of the mode switch and the volume-up switch are applied from remaining subsidiary radio sets with radio communication disconnected, other than the subsidiary radio set changed to the slave master radio set, the subsidiary communication units of the subsidiary radio sets are controlled and the subsidiary radio sets are changed to slave subsidiary radio sets that are able to transmit/receive voice signals to/from the slave master radio set, and when input signals of the mode switch are applied from the slave master radio set and the slave subsidiary radio sets, radio communication between the slave master radio set and the slave subsidiary radio sets is disconnected and made with the master radio set.

The subsidiary controller carries out the control function in such a way that, when the subsidiary radio sets go beyond the coverage area available for communication with the master radio set and lose radio communication, a sound indicating that radio communication has been disconnected is output to receivers of the subsidiary radio sets, when any one of the subsidiary radio sets is changed to the slave master radio set, a sound indicating the change is output to a receiver of the subsidiary radio set, and when radio communication between the slave master radio set and the slave subsidiary radio sets is disconnected, a sound indicating the disconnection is output to each of the receivers of the slave master radio set and the slave subsidiary radio sets.

The subsidiary radio sets further include respective display units comprising LED devices, and the subsidiary controller carries out the control function in such a way that, when any one of the subsidiary radio sets is changed to the slave master radio set, a red light is displayed on the display unit of the subsidiary radio set, and when the subsidiary radio sets are changed to the slave subsidiary radio sets, a green light is displayed on the display units of the subsidiary radio sets.

When the PTT switch is turned off, the master controller controls the master communication unit so that voice signals input into the subsidiary transmitters of the main radio set and the subsidiary radio sets are output to the master receiver, and voice signals input into the main radio set and the master transmitter are transmitted to the subsidiary communication units.

When the PTT switch is turned on, the master controller controls the master communication unit so that the only voice signals input into the main radio set are output to the master receiver, and voice signals input into the main radio set and the master transmitter are not transmitted to the subsidiary communication units As described above, the present invention provides a radio communication system enabling multiplex communication in which individual members are allowed to possess either a main radio set performing long range radio communication; a master radio set connected to the main radio set; or a subsidiary radio set performing short range radio communication with the master radio set, the master radio set being configured to output all of audio input from the subsidiary radio sets, and all of the subsidiary radio sets as well as the master radio set are designed to output voices forwarded from any higher level radio set than the master radio set, whereby tactical operations can be strengthened and superior combat effectiveness can be guaranteed, by making fast and streamlined communication possible.

When any subsidiary radio set goes beyond a coverage area available for communication with a master radio set and loses radio communication, the radio communication system enabling multiplex communication in accordance with the present invention can accomplish smooth communication between subsidiary radio sets deviating out of the communication coverage area and a master radio set, by establishing another communication network in which one of the subsidiary radio sets can be changed to a master, i.e. a slave master radio set and the remaining slave radio sets can make radio communication with the slave master radio set.

In addition, the radio communication system enabling multiplex communication in accordance with the present invention can provide fast communication capabilities for creating efficient tactical operations and improving combat effectiveness by controlling a notification unit to notify members when any slave radio set goes beyond or comes into a radio communication coverage area between a master radio set and subsidiary radio sets and displaying on a display unit that it has become a slave master radio set.

BRIEF DESCRIPTION OF DRAWINGS

FIG. 8 is a drawing illustrating a condition of the backside of a common military helmet; and FIG. 9(A) and FIG. 9(B) are partially magnified photos of a liner and inner side of a military helmet.

Figure 1:
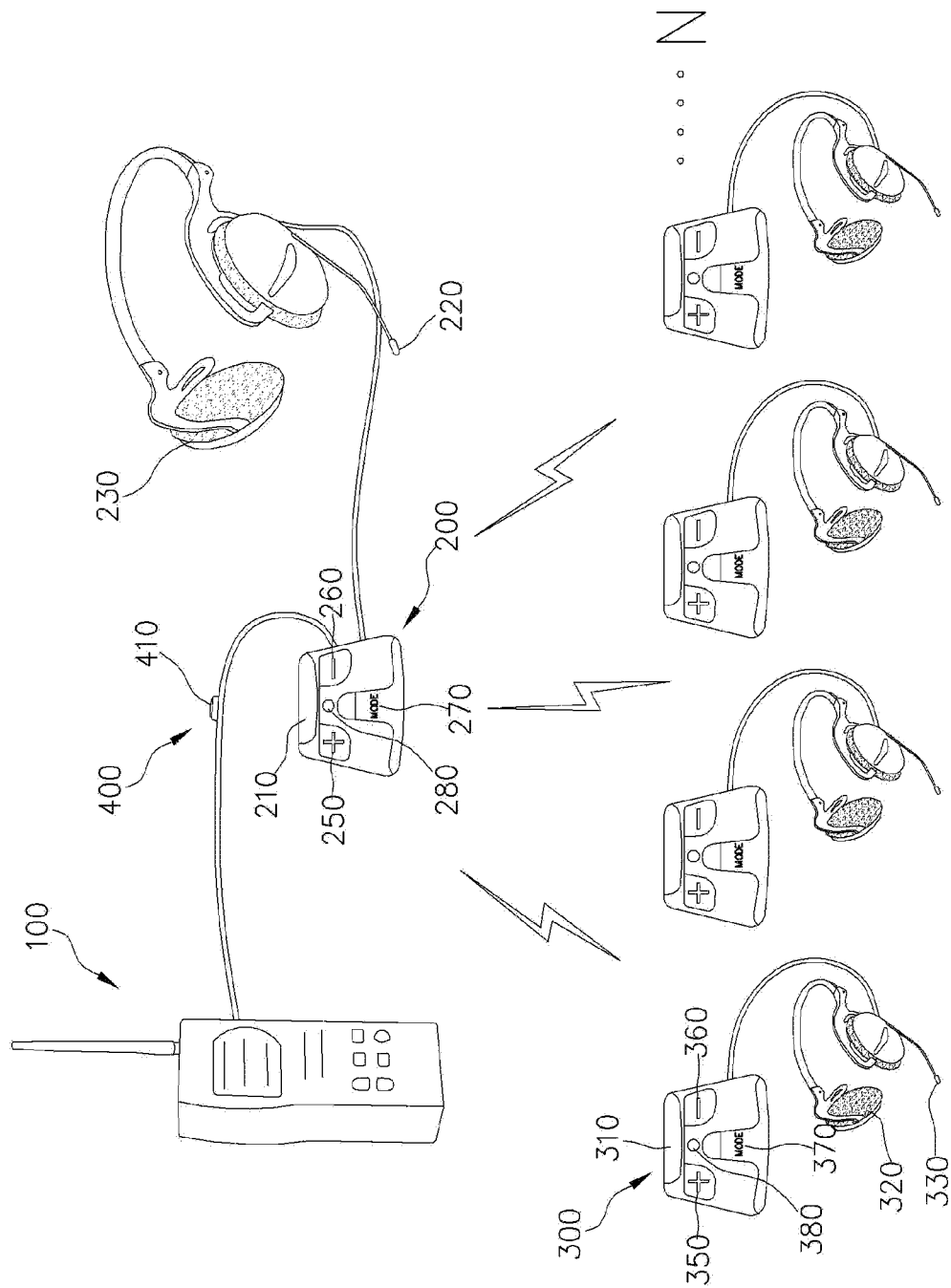
FIG. 1 a schematic diagram illustrating a radio communication system enabling multiplex communication in accordance with an embodiment of the present invention.

<Description of the Reference Numerals in the Drawings>

| | |
|---|---|
| 1: Liner | 2: Helmet Body |
| 4: Fixing Band | 5: Bending Flat Spring Support Plate |
| 6: Snap Button | 7: Mounting Hook |
| 8: Snap Button Slot | 9: Fastening Piece |
| 100: Main Radio Set | 200: Master Radio Set |
| 210: Master Communication Unit | 220: Master Transmitter |
| 230: Master Receiver | 240: Master Controller |
| 250, 350: Volume-Up Switch | |
| 260, 360: Volume-Down Switch | |
| 270, 370: Mode Switch | 300: Subsidiary Radio Set |
| 310: Subsidiary Communication Unit | |
| 320: Subsidiary Transmitter | |
| 330: Subsidiary Receiver | 340: Subsidiary Controller |
| 380: Display Unit | 400: Connecting Unit |
| 410: PTT Switch | 500: Main Communication Network |
| 510: The Primary Communication Network | |
| 520: The Secondary Communication Network | |
| 600: Slave Master Radio Set | |
| 610: Slave Subsidiary Radio Set | |

DETAILED DESCRIPTION OF THE INVENTION

Benefits, features and methods of achieving the same of the present invention will be clarified with reference to embodiments to be described in detail below with reference to the attached drawings. However, it should be understood that those embodiments are not intended to limit the present invention to specific disclosure forms, but they will be realized as various different forms, provided for complementing embodiments of the present invention and fully informing those with common knowledge in the art of the present invention of a category of the present invention and defined by scopes of claims of the present invention. Sizes and relative sizes of layers and areas in drawings may be exaggerated for clear explanation. Any and all of same reference symbols throughout the specifications refer to the same elements.

A radio communication system enabling multiplex communication according to the present invention will be described with reference to the accompanying drawings.

Figure 2:
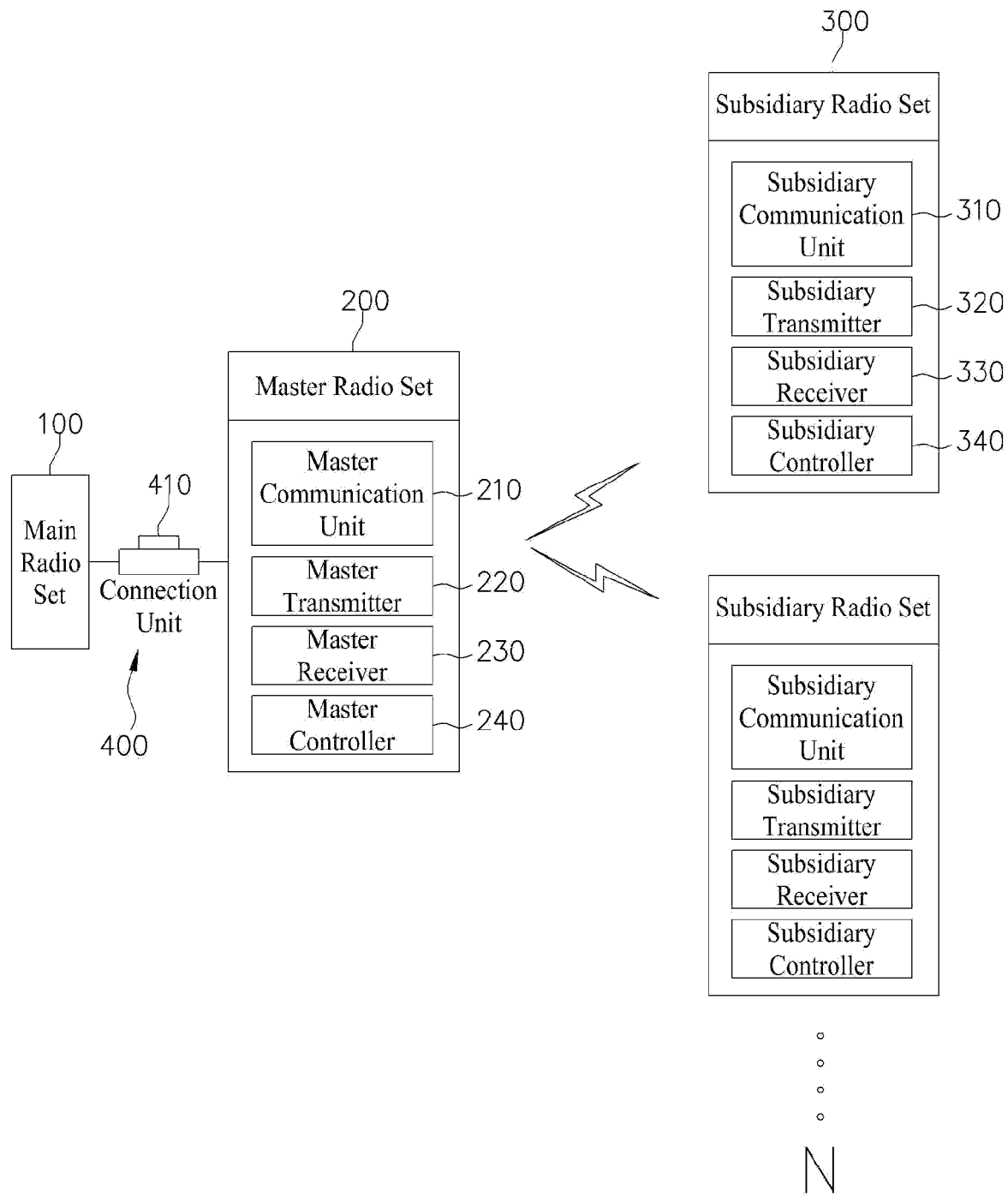
FIG. 2 is a block diagram illustrating a radio communication system enabling multiplex communication in accordance with an embodiment of the present invention.

FIG. 1 is a schematic view illustrating a radio communication system enabling multiplex communication in accordance with an embodiment of the present invention. FIG. 2 is a block diagram illustrating a radio communication system enabling multiplex communication in accordance with an embodiment of the present invention.

Referring to FIG. 1 and FIG. 2, the radio communication system enabling multiplex communication in accordance with an embodiment of the present invention, may include a main radio set 100, a master radio set 200, a subsidiary radio set 300 and a connection unit 400.

The main radio set 100 carries out long range radio communication.

For example, a main radio set 100 is used for squad leaders to transmit/receive voice communication with each other through the main radio set 100, or a platoon leader and a squad leader to individually transmit/receive voice communication with each other through the main radio set 100.

A master radio set 200 may include a master communication unit 210, a master transmitter 220, a master receiver 230 and a master controller 240.

A master communication unit 210 carries out wired communication for transmitting/receiving voice signals to/from a main radio set 100.

In this case, the main radio set 100 and the master radio set 200 are connected to the connection unit 400.

The connection unit 400 connects the main radio set 100 and the master radio set 200 for transmitting/receiving voice signals each other, and a PTT switch 410 is configured so that voice signals can be transmitted and received with a PTT (Push to Talk) method.

The voice signals are input into the master transmitter 220.

The master receiver 230 outputs the voice signals.

When the voice signals are input and output into the master transmitter 220 and the master receiver 230, analog voice signals are converted into digital voice signals by a voice codec (not shown) that converts between analog voice signals and digital voice signals and the converted digital voice signals are transmitted by the master communication unit 210 to other radio sets.

Moreover, digital voice signals received by the master communication unit 210 are converted into analog voice signals by the voice codec and output to the master receiver 230.

In addition, a subsidiary communication unit 310, a subsidiary transmitter 320 and a subsidiary receiver 330 to be described below also operate as described above and detailed description is omitted as they are all known technologies.

The master transmitter 220 and the subsidiary transmitter 320 may include but are not limited to microphones, etc. into which voice signals can be input, and the master receiver 230 and the subsidiary receiver 330 may include but are not limited to speakers, etc. from which voice signals can be output.

The master controller 240 controls the master communication unit 210 according to on or off state of the PTT switch 410.

The master controller 240 also controls the master communication unit 210 so that it can transmit voice signals input into the master transmitter 220 to the main radio set 100 and the subsidiary radio set 300 to be described below, and receives voice signals transmitted from the main radio set 100 and the subsidiary radio set 300.

The master controller 240 is described below in detail.

When the PTT switch 410 turns off, the master controller 240 controls the master communication unit 210 so that voice signals input into the subsidiary transmitter 320 of the main radio set 100 and multiple subsidiary radio sets 300 should be output to the master receiver 230, and voice signals input into the main radio set 100 and master transmitter 220 should be transmitted to the subsidiary communication unit 310.

When the PTT switch 410 turns off, the master controller 240 controls the master communication unit 210 so that voice signals only input into the main radio set 100 should be output to the master receiver 230 and voice signals input into the main radio set 100 and master transmitter 220 should not be transmitted to the subsidiary communication unit 310.

Figure 3:
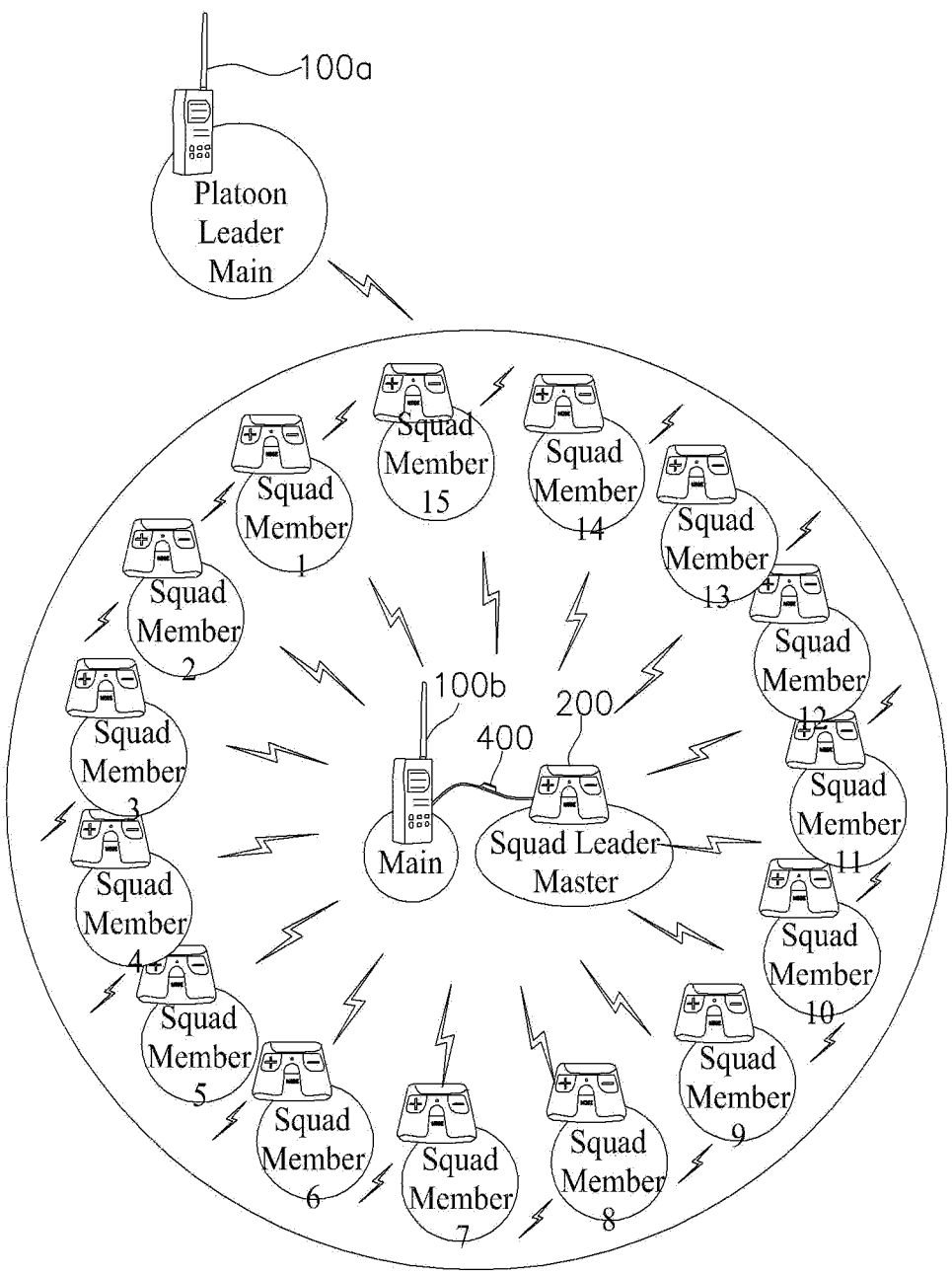
FIG. 3 is a drawing illustrating a use example of a radio communication system enabling multiplex communication in accordance with an embodiment of the present invention.

FIG. 3 is a drawing illustrating a use example of a radio communication system enabling multiplex communication in accordance with an embodiment of the present invention.

For example, FIG. 3 and [Table 1] below illustrates operation relation of the PTT switch 410 configured on the connection unit 400 for connecting the main radio set 100 and the master radio set 200 held by a squad leader.

TABLE 1

| Status (PTT Switch configured on the Connection Unit 400) | Squad Leader (Main + Master) | | Squad Members | | Platoon Leader (Main) | |
|---|---|---|---|---|---|---|
| | Transmitter | Receiver | Transmitter | Receiver | Transmitter | Receiver |
| PTT Switch Off | ON | Voice of Squad Leader + Voice of Squad Members | ON | Voice of Platoon Leader + Voice of Squad Leader + Voice of Squad Members | MUTE | Voice of Squad Leader + Voice of Squad Members |
| PTT Switch On | ON | Voice of Platoon Leader | MUTE | MUTE | MUTE | Voice of Squad Leader |

When a platoon leader has a main radio set 100a and a squad leader has a combination of a main radio set 100b that can communicate with the main radio set 100 of the platoon leader and the master radio set 200, and squad members have the subsidiary radio sets 300 that can communicate with the master radio set 200, when the squad leader turns on the PTT switch 410, the squad members can hear the platoon leader and the squad leader voices and the voices of each squad member, and the squad leader can hear voices of all squad members transmitted from the multiple subsidiary radio sets 300. Furthermore, the platoon leader can also hear the voices of the squad leader and the squad members.

At this moment, when the squad leader turns on the PTT switch 410, it is preferable that voices should be transmitted to the main radio set 100 of the platoon leader and squad leader only, and when the platoon leader wants to transmit voices to the squad leader, voices should be transmitted to the master radio set 200 of the squad leader only by turning on the PTT switch 410 of a main terminal held by the platoon leader. It may represent a status wherein the squad leader and platoon leader cannot hear the voices of the squad members, and the squad members cannot hear voices of the platoon leader and the squad leader, while the squad members may hear voices of the platoon leader and the squad leader, when a communication mode is changed.

Moreover, it is preferable that the predetermined communication mode can be changed by a mode switch to be described below and various types of communication can be achieved according to change to the predetermined communication mode, but it should not be limited to such an example.

Figure 4:
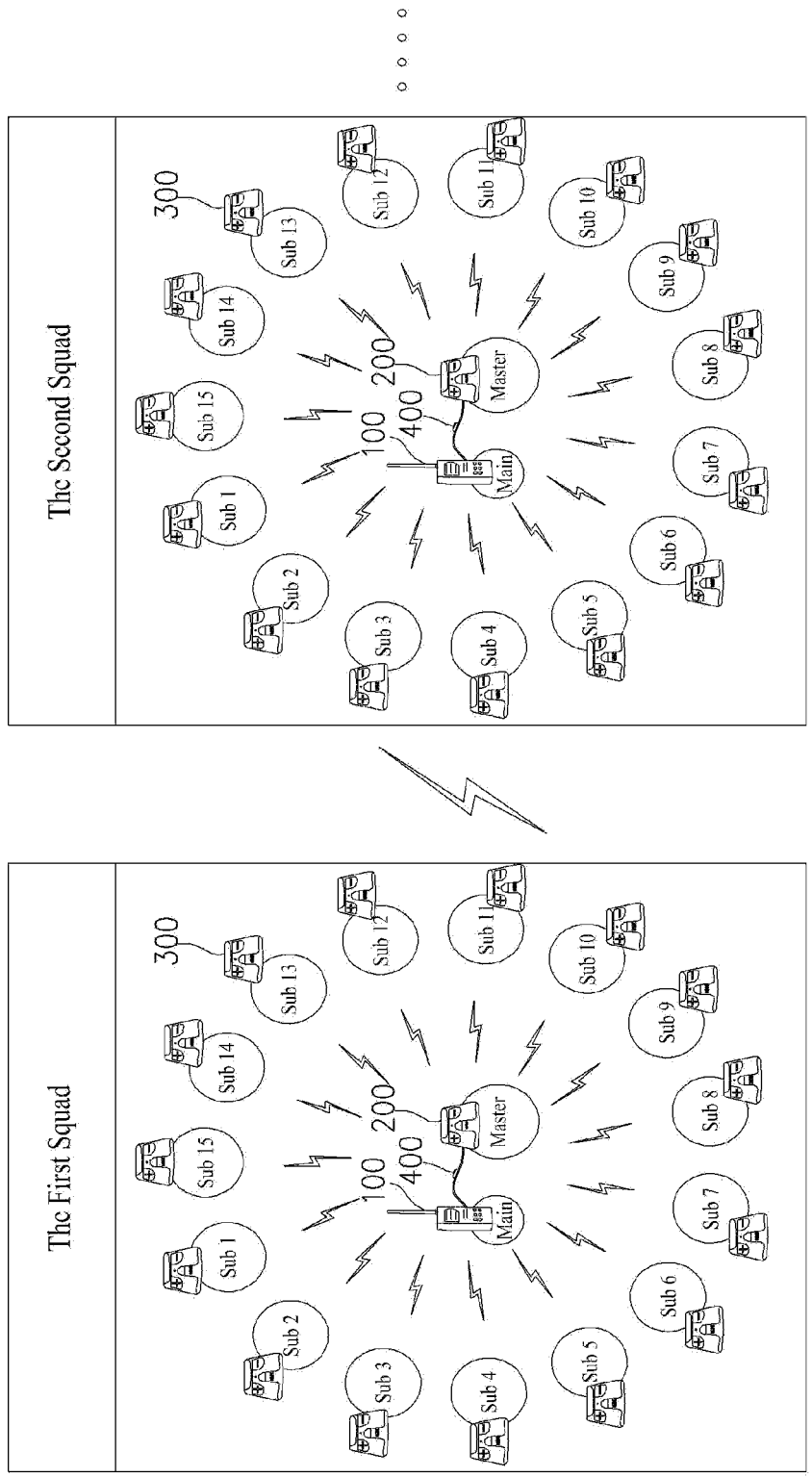
FIG. 4 is a drawing illustrating another use example of a radio communication system enabling multiplex communication in accordance with an embodiment of the present invention.

FIG. 4 is a drawing illustrating another use example of a radio communication system enabling multiplex communication in accordance with an embodiment of the present invention.

As illustrated in FIG. 4, when squad leaders of the first and the second squads possess the main radio set 100, each squad may transmit or receive voice signals.

Accordingly, fast and smooth communication can be made between the platoon leader, the squad leader and squad members, or between squads through a radio communication system enabling multiplex communication according to the present invention in order to strengthen tactical operations and ensure superior combat effectiveness.

In addition, the master radio set 200 may additionally include a volume-up switch 250 and a volume-down switch 260 for adjusting volume of the master receiver 230, and a mode switch 270 for changing a predetermined communication mode.

The subsidiary radio set 300 may include the subsidiary communication unit 310, the subsidiary transmitter 320, the subsidiary receiver 330 and a subsidiary controller 340.

The subsidiary communication unit 310 carries out short range radio communication for allowing the transmission/reception of voice signals to/from the master communication unit 210.

The voice signals are input into the subsidiary transmitter 320.

The subsidiary receiver 330 outputs the voice signals.

A subsidiary controller 340 carries out a control function by which, when any one of the subsidiary radio sets 300 goes beyond a coverage area available for radio communication with the master radio set 200 and loses radio communication, one of the subsidiary radio sets 300 deviating out of the radio communication coverage area can be changed to a master, i.e. a slave master radio set 600.

In addition, the subsidiary radio set 300 may additionally include a volume-up switch 350 and a volume-down switch 360 for adjusting volume of the master receiver 330, and a mode switch 370 for changing a predetermined communication mode.

When a subsidiary radio set 300 has lost communication with the master radio set 200, the subsidiary radio set 300 is changed to a slave master radio set 600, as described below in detail.

At first, the subsidiary controller 340 carries out a control function in such a way that, when any one of the subsidiary radio sets 300 goes beyond a coverage area available for radio communication with the master radio set 200 and loses radio communication, inputting input signals of the mode switch 370 and the volume-up switch 350 into any one of the subsidiary radio sets 300 deviating out of the radio communication coverage area must be controlled to induce the subsidiary radio set 300 to be changed to a slave master radio set 600.

In this regard, when input signals of the mode switch 370 and the volume-down switch 360 are input into any one of the remaining subsidiary radio sets 300 away from the radio communication coverage area, except the subsidiary radio set 300 which has been changed to the slave master radio set 600, the subsidiary controller 340 controls a subsidiary communication unit 310 of the subsidiary radio set 300 so that the subsidiary radio set 300 should be changed to a slave subsidiary radio set 610 available for sending/receiving voice signals to/from the slave master radio set 600.

In addition, the subsidiary controller 340 carries out a control function by which, when input signals of a mode switch are input from the slave master radio set 600 and a slave subsidiary radio set 610, radio communication between the slave master radio set 600 and the slave subsidiary radio set 610 should be severed and re-established with the master radio set 200.

Figure 5:
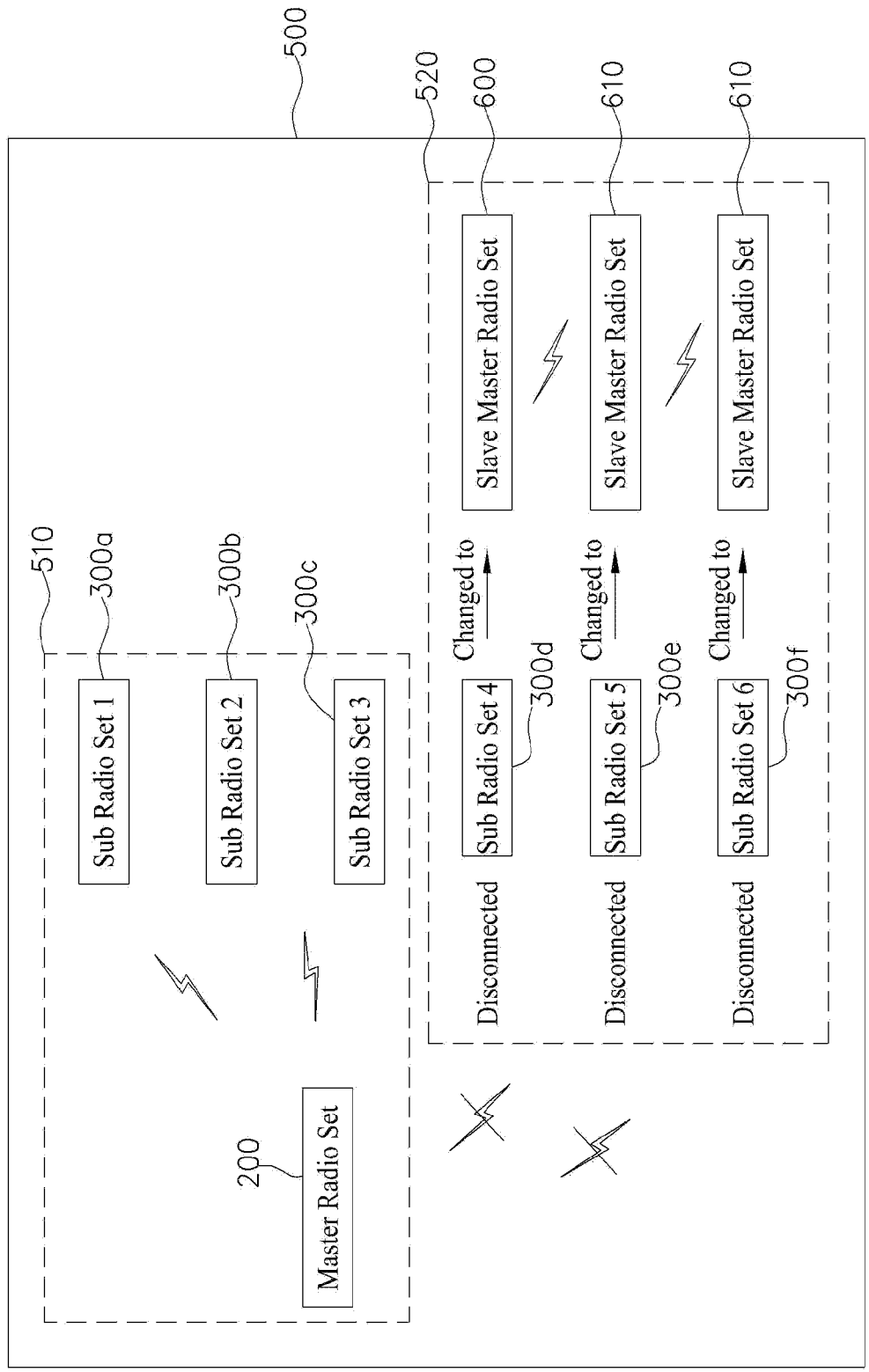
FIG. 5 is a drawing illustrating when communication of a radio communication system enabling multiplex communication in accordance with an embodiment of the present invention has been disconnected.

FIG. 5 is a drawing illustrating when communication of a radio communication system enabling multiplex communication in accordance with an embodiment of the present invention has been disconnected.

For example, it is assumed that a master radio set 200 and six subsidiary radio sets 300 are making radio communication through a main communication network (500).

At this moment, when a subsidiary radio set #4 300d, a subsidiary radio set #5 300e and a subsidiary radio set #6 300f out of multiple subsidiary radio sets 300 go beyond a coverage area available for communication with the master radio set 200, the master radio set 200, the subsidiary radio set #4 300d, the subsidiary radio set #5 300e and the subsidiary radio set #6 300f lose communication.

When a mode switch and a volume-up switch on the subsidiary radio set #4 300d are pressed, the subsidiary radio set #4 300d is changed to a slave master radio set 600.

If the mode switch 370 and the volume-down switch 360 are pressed thereon, each of the subsidiary radio set #5 300e and the subsidiary radio set #6 300f is changed to a slave subsidiary radio set 610 and starts radio communication with the slave master radio set 600.

Accordingly, the main communication network 500 is divided into the first communication network 510 and the second communication network 520, the master radio set 200, a subsidiary radio set #1 300a, a subsidiary radio set #2 300c and a subsidiary radio set #3 300c continue to use the first communication network 510 that is the main communication network 500.

Then, the slave master radio set 600 and the slave subsidiary radio sets 610 establish and use the second communication network 520.

When the slave master radio set 600 and the slave subsidiary radio set 610 come within a coverage area available for communication with the master radio set 200 and have the mode switch 370 pressed, the second communication network 520 is disconnected and they can join the main communication network 500 and resume communication with the master radio set 200.

Consequently, it is possible to achieve smooth communication among the subsidiary radio sets 300 out of the communication coverage area from the master radio set 200, to conduct more efficient training exercises and establish effective tactical operations through fast response to the situation.

On the other hand, the subsidiary controller 340 carries out a control function by which when a subsidiary radio set 300 goes beyond a coverage area for radio communication and loses radio communication, a disconnection tone is released to a subsidiary receiver 330 of the subsidiary radio set 300 with radio communication disconnected. An example may include but is not limited to releasing a sound of 500 Hz 50 msec twice.

In addition, the subsidiary controller 340 carries out a control function by which when a subsidiary radio set 300 is changed to a slave master radio set 600, an establishment tone should be released to a subsidiary receiver 330 of the subsidiary radio set 300. An example may include but is not limited to a one-time release of a sound of 500 Hz 50 msec.

In addition, the subsidiary controller 340 carries out a control function by which, when radio communication of the slave master radio set 600 and the slave subsidiary radio set 610 has been released, a releasing tone should be released to receivers of the slave master radio set 600 and the slave subsidiary radio set 610. An example may include but is not limited to releasing a sound of 500 Hz 200 msec.

In addition, the subsidiary controller 340 is able to carry out a control function by which, when the slave master radio set 600 and slave subsidiary radio set 610 are making communication through the second communication network 520, a communication tone should be released to receivers of the slave master radio set 600 and the slave subsidiary radio set 610, and a disconnection tone should be released to a master receiver 230 of the master radio set 200 when the master controller 240 of the master radio set 200 has radio communication disconnected with the subsidiary radio set 300.

A subsidiary radio set 300 may additionally include a display unit 380 comprising LED devices.

The subsidiary controller 340 also carries out a control function by which when a subsidiary radio set 300 is changed to a slave master radio set 600, a red light should be displayed on a display unit 380 of the subsidiary radio set 300. An example may include but is not limited to illuminating a red light for 200 msec every second repeatedly.

The subsidiary controller 340 also carries out a control function by which when a subsidiary radio set 300 is changed to a slave master radio set 600, a green light should be displayed on a display unit 380 of the subsidiary radio set 300. An example may include but is not limited to illuminating a green light for 200 msec every second repeatedly.

The subsidiary controller 340 may also carry out a control function by which when normal radio communication becomes available, a subsidiary controller 340 should display a green light on a display unit of the subsidiary radio set 300, or the subsidiary controller 340 should display a red light on the display unit 380, when radio communication is not available.

In other words, as it is possible for squad members to quickly identify and respond to the availability of communication via an alarm unit and a display unit 380, it is therefore possible to establish efficient tactical operations and improve combat effectiveness.

It is preferable for the master radio set 200 and the subsidiary radio set 300 as described above to be small sized so as to be attached and held on a military helmet worn to protect heads of soldiers, a night vision system, or other personal military supplies.

Next, an embodiment by which a master radio set 200 or a subsidiary radio set 300 is mounted on a military helmet is described below.

Although only a method of mounting a master radio set 200 or a subsidiary radio set 300 on a military helmet is explained here, it does not limit application to a military helmet, and a master radio set 200 or a subsidiary radio set 300 can be attached and held on a safety helmet, a sports helmet or a motor bike helmet, etc. found throughout various industries.

A radio communication system enabling multiplex communication according to the present invention may additionally include a mounting device for a military helmet.

Figure 6:
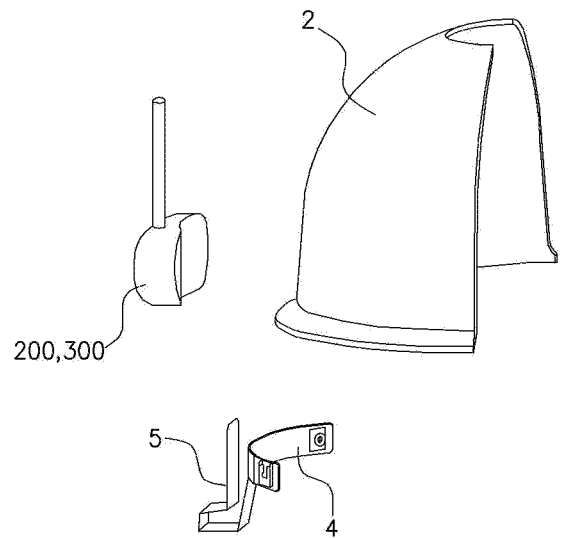
FIG. 6 is a drawing illustrating a state when a master radio set or a subsidiary radio set is separated from a military helmet.
Figure 7:
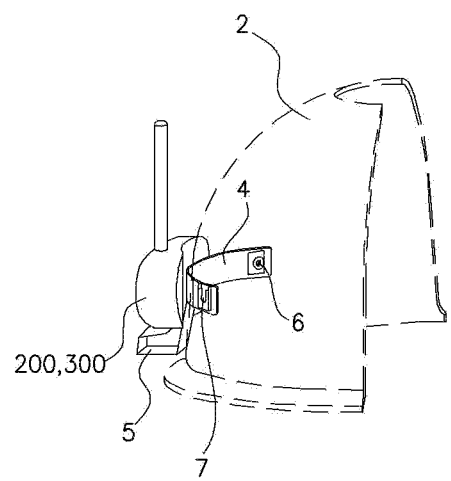
FIG. 7 is a drawing illustrating a state when a master radio set or subsidiary radio set is mounted on a military helmet.

FIG. 6 is a drawing illustrating a state when a master radio set or a subsidiary radio set is separated from a military helmet, and FIG. 7 is a drawing illustrating a state when a master radio set or subsidiary radio set is mounted on a military helmet.

Referring to FIG. 6 and FIG. 7, a military helmet comprises an inner head fastening band, a liner 1 and a helmet body 2 in which the liner 1 is fixed.

A mounting apparatus for a military helmet comprises a circular fixing band 4 to be inserted between the helmet body 2 and the liner 1; and a bending flat spring base plate 5 connected under the fixing band and having a snapping property to be protruded outside the helmet body 2.

A snap button 6 and a mounting hook 7 are attached on both ends of the circular fixing band 4.

The snap button 6 has a structure for being combined or separated in a snap button slot 8 formed inside the helmet body 2.

The mounting hook 7 has also a structure for being combined or separated in a fastening piece 9 attached to the liner.

At this point, as the circular fixing band 4 is formed in a shape of a round band to be fixed on a round area of the helmet body 2 and has a same curve with the helmet body when it is fixed to the liner 1 within the helmet body, such that a wearer does not feel any inconvenience.

And, as the bending flat spring base plate 5 to be connected in a suspension support method at the circular fixing band 4 has a shape of a snapping flat spring, the bending flat spring base plate 5 solidly compresses and securely supports the wearer's personal supplies with no worry about loss during carriage.

On the other hand, FIG. 8 is a drawing illustrating a condition of the backside of a common military helmet, and FIG. 9(A) and FIG. 9(B) are partially magnified photos of a liner and inner side of a military helmet.

Referring to FIG. 8 and FIG. 9, A liner 1 is equipped with a fastening piece 9 in which a mounting hook 7 on one end of the circular fixing band 4 is hooked when it is inserted and mounted between the helmet body 2 and the liner as illustrated FIG. 2.

The helmet body 2 is equipped with a snap button slot in which the snap button on the other end of the circular fixing band 4 is hooked.

In other words, the fastening pieces 9 and snap button slots can be installed on several points of a military helmet for allowing attachment of several mounting devices on the military helmet if required.

As described above, as a mounting apparatus for a military helmet allows attachment of military supplies such as the main radio set 200, the subsidiary radio set 300, a night vision system, etc. on the existing military helmet, depending on necessity without a particular modification for performing missions, it provides easy management of personal supplies, convenient carriage and wearing a helmet without any obstruction in performing missions.

Those who have common knowledge of a technical area to which the present invention belongs can understand that the present invention may be implemented to another specific pattern without alteration of its technical sprit or necessary features. Thus, it should be understood that the embodiments described above are simply examples for all aspects and do not mean any restriction. A scope of the present invention is indicated in the accompanying claims to be described below, and it should be interpreted that all of modifications or transformed patterns derived from meaning and scope of claims, and their equivalent concepts are included in a scope of the present invention.

The invention claimed is:

1. A radio communication system enabling multiplex communication, comprising:
   a master radio set including:
   a main radio set carrying out long-range radio communication, a master communication unit carrying out wired communication for allowing voice signals to be transmitted/received to/from the main radio set,
a master transmitter to which voice signals are input,
a master receiver outputting voice signals, and
a master controller for controlling the master communication according to on or off state of a PTT switch;
a plurality of subsidiary radio sets, each including:
a subsidiary communication unit carrying out short-range radio communication for allowing voice signals to be transmitted/received to/from the master communication unit,
a subsidiary transmitter to which voice signals are input,
a subsidiary receiver outputting voice signals, and
a subsidiary controller carrying out a control function in such a way that, when the subsidiary radio sets go outside a coverage area available for communication with the master radio set and lose radio communication, any one of the subsidiary radio sets with radio communication disconnected can be changed to a slave master radio set; and
a connection unit connecting the main radio set and the master radio set to each other to transmit and receive voice signals, and provided with the PTT switch to carry out a control function to transmit and receive voice signals in a PTT method.

2. The radio communication system of claim 1, wherein each of the master radio set and subsidiary radio sets further include a volume-up switch and a volume-down switch to adjust volume of the master receiver and the subsidiary receivers, and a mode switch for changing predetermined communication modes,
said subsidiary controller carrying out the control function in such a way that,
when the subsidiary radio sets go beyond the coverage area available for communication with the master radio set and lose radio communication, and input signals of the mode switch and the volume-up switch are applied from any one of the subsidiary radio sets with radio communication disconnected, the subsidiary radio set is changed to the slave master radio set,
when input signals of the mode switch and the volume-up switch are applied from remaining subsidiary radio sets with radio communication disconnected, other than the subsidiary radio set changed to the slave master radio set, the subsidiary communication units of the subsidiary radio sets are controlled and the subsidiary radio sets are changed to slave subsidiary radio sets that are able to transmit/receive voice signals to/from the slave master radio set, and
when input signals of the mode switch are applied from the slave master radio set and the slave subsidiary radio sets, radio communication between the slave master radio set and the slave subsidiary radio sets is disconnected and reestablished with the master radio set.

3. The radio communication system of claim 2, wherein the subsidiary controller carries out the control function in such a way that,
when the subsidiary radio sets go beyond the coverage area available for communication with the master radio set and lose radio communication, a sound indicating that radio communication has been disconnected is output to receivers of the subsidiary radio sets,
when any one of the subsidiary radio sets is changed to the slave master radio set, a sound indicating the change is output to a receiver of the subsidiary radio set, and
when radio communication between the slave master radio set and the slave subsidiary radio sets is disconnected, a sound indicating the disconnection is output to each of the receivers of the slave master radio set and the slave subsidiary radio sets.

4. The radio communication system of claim 2, wherein the subsidiary radio sets further include respective display units comprising LED devices, and the subsidiary controller carries out the control function in such a way that,
when any one of the subsidiary radio sets is changed to the slave master radio set, red light is displayed on the display unit of the subsidiary radio set, and
when the subsidiary radio sets are changed to the slave subsidiary radio sets, a green light is displayed on the display units of the subsidiary radio sets.

5. The radio communication system of claim 1, wherein when the PTT switch is turned off, the master controller controls the master communication unit so that voice signals input into the subsidiary transmitters of the main radio set and the subsidiary radio sets are output to the master receiver, and voice signals input into the main radio set and the master transmitter are transmitted to the subsidiary communication units.

6. The radio communication system of claim 1, wherein when the PTT switch is turned on, the master controller controls the master communication unit so that the only voice signals input into the main radio set are output to the master receiver, and voice signals input into the main radio set and the master transmitter are not transmitted to the subsidiary communication units.

* * * * *